US007000755B2

(12) United States Patent
van Pinxteren et al.

(10) Patent No.: US 7,000,755 B2
(45) Date of Patent: Feb. 21, 2006

(54) APPARATUS FOR REPOSITIONING PRODUCT WHILE MAINTAINING FORWARD CONVEYING SPEED

(75) Inventors: Adrianus van Pinxteren, Eemnes (NL); Freerk Dirk Slagman, Veenendaal (NL)

(73) Assignee: FPS Food Processing Systems, B.V., (NL)

( * ) Notice: Subject to any disclaimer, the term of this patent is extended or adjusted under 35 U.S.C. 154(b) by 0 days.

(21) Appl. No.: 10/169,708

(22) PCT Filed: Jan. 11, 2001

(86) PCT No.: PCT/NL01/00015

§ 371 (c)(1),
(2), (4) Date: Dec. 4, 2002

(87) PCT Pub. No.: WO01/51390

PCT Pub. Date: Jul. 19, 2001

(65) Prior Publication Data

US 2003/0134019 A1 Jul. 17, 2003

(30) Foreign Application Priority Data

Jan. 14, 2000 (NL) .................................... 1014063

(51) Int. Cl.
*B65G 47/24* (2006.01)

(52) U.S. Cl. .................. 198/374; 198/440; 198/377.08

(58) Field of Classification Search ................ 198/443, 198/445, 410–412, 418.7, 427, 429, 431, 198/374, 377.01–377.03, 377.07, 377.08, 198/440, 890, 890.1
See application file for complete search history.

(56) References Cited

U.S. PATENT DOCUMENTS

| | | | | |
|---|---|---|---|---|
| 3,729,084 | A * | 4/1973 | Stuart et al. | 198/426 |
| 3,747,737 | A * | 7/1973 | Brooke | 198/31 AA |
| 3,777,873 | A * | 12/1973 | Stuart | 198/346.2 |
| 3,868,009 | A * | 2/1975 | Billi et al. | 198/461.2 |
| 3,887,060 | A * | 6/1975 | Kamhues | 198/426 |
| 3,961,698 | A * | 6/1976 | Ahlenius et al. | 198/377.03 |
| 4,164,296 | A * | 8/1979 | Trees | 414/416.02 |
| 4,287,980 | A * | 9/1981 | Montferme | 198/425 |
| 4,697,691 | A * | 10/1987 | Zodrow et al. | 198/426 |
| 5,188,211 | A * | 2/1993 | Ringot et al. | 198/411 |
| 5,722,532 | A * | 3/1998 | Troisi et al. | 198/890 |
| 5,944,479 | A * | 8/1999 | Kanaya et al. | 414/791.6 |
| 5,988,354 | A * | 11/1999 | Spatafora et al. | 198/471.1 |
| 6,109,419 | A * | 8/2000 | Spatafora et al. | 198/377.08 |
| 6,112,880 | A * | 9/2000 | Flix | 198/419.2 |
| 6,722,494 | B1 * | 4/2004 | Nakakado | 198/792 |
| 6,786,328 | B1 * | 9/2004 | Honegger | 198/890.1 |

* cited by examiner

*Primary Examiner*—Gene O. Crawford
*Assistant Examiner*—Rashmi Sharma
(74) *Attorney, Agent, or Firm*—Stites & Harbison PLLC; Marvin Petry

(57) ABSTRACT

An apparatus comprising a first conveyor and a second conveyor, the first and the second conveyor being arranged in line with each other, having the same conveying direction and, in use, having substantially the same conveying speed, while between the first and the second conveyor a pattern former is arranged which is adapted to pick up products supplied by the first conveyor and, while maintaining the forward conveying speed, to place the products on the second conveyor, the pattern former being provided with steering means to displace each product in a direction transverse to the conveying direction, and optionally reorient it, between the pickup and placement of the product.

14 Claims, 4 Drawing Sheets

APPARATUS FOR REPOSITIONING PRODUCT WHILE MAINTAINING FORWARD CONVEYING SPEED

This invention relates to an apparatus according to the preamble of claim 1.

Such an apparatus is known from EP-A-0 769 459. The publication discloses an apparatus in which products, more particularly soap bars, are fed ordely at predetermined intervals by a first conveyor, are picked up from the first conveyor and reoriented by a product transfer device, and are placed in a fixed pattern on a second conveyor. In the known apparatus the products can only obtain two orientations. The first orientation is determined by even clamping units and the second orientation is determined by odd clamping units of the product transfer device. The product transfer device comprises one conveyor which directly carries the clamping elements for clamping the products to be handled. As a consequence of the fact that only two positions/orientations are feasible, placement of products in more than two tracks is not possible.

The object of the present invention is to provide an apparatus with which a continuous stream of products, supplied by the first conveyor at equal interspaces and with equal orientation, can be distributed over a plurality of tracks located next to each other on the second conveyor without these products thereby experiencing a considerable change in forward speed.

To that end, the apparatus of the preamble of claim 1 is characterized, according to the invention by the characterizing features of claim 1.

Such an apparatus enables products that are being supplied at a high conveying speed to be placed on the second conveyor in a desired transverse position without considerable change in speed. Accordingly, the products do not need to be stopped to be subsequently displaced in transverse direction, which would constitute a bottleneck in the throughput capacity of the apparatus. Moreover, as a result of the forward speed being maintained, fragile products too can be changed in position without risk of damage. The apparatus according to the invention is therefore suitable in particular for reforming a continuous stream of fragile products, such as, for instance, cartons with eggs.

What is accomplished in that the products are picked up by a gripper and subsequently are displaced in transverse direction, is that the product experiences no friction in that, for instance, it is displaced over a bearing surface. Indeed, frictional forces could damage the products, in particular when these products are formed, for instance, by fragile packages, such as egg cartons filled with eggs.

Pattern forming apparatuses in which the products are shifted while being carried on a transport surface are known from e.g. U. S. Pat. No. 3,809,254 and U.S. Pat. No. 3,627,103.

When the cartons, in top plan view, are not symmetric but, for instance, rectangular, it is preferred, according to a further elaboration of the invention, when the pattern former is further provided with orientation means to rotate the product around a vertical axis, between pickup and placement of each product, so that the orientation of the product can be changed.

With such an apparatus, the products therefore can be placed on the second conveyor not only in different positions in transverse direction but also be rotated through, for instance, 90°, so that on the second conveyor products are supplied having different positions in transverse directions and different orientations. When downstream on the second conveyor a detaining element is arranged for temporarily detaining the products supplied, thus a specific product pattern can be created which is suitable, for instance, to be placed in an outer package, such as a crate, box or the like.

Further elaborations are described in the subclaims and will be further clarified hereinafter on the basis of an exemplary embodiment, with reference to the drawing.

Figure 1:
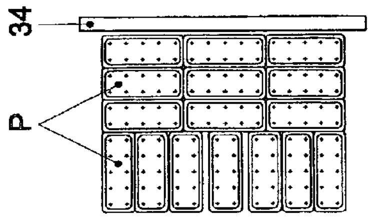
FIG. 1 shows a cross sectional view taken on line I—I in FIG. 2 of an exemplary embodiment of the apparatus according to the invention.
Figure 1:
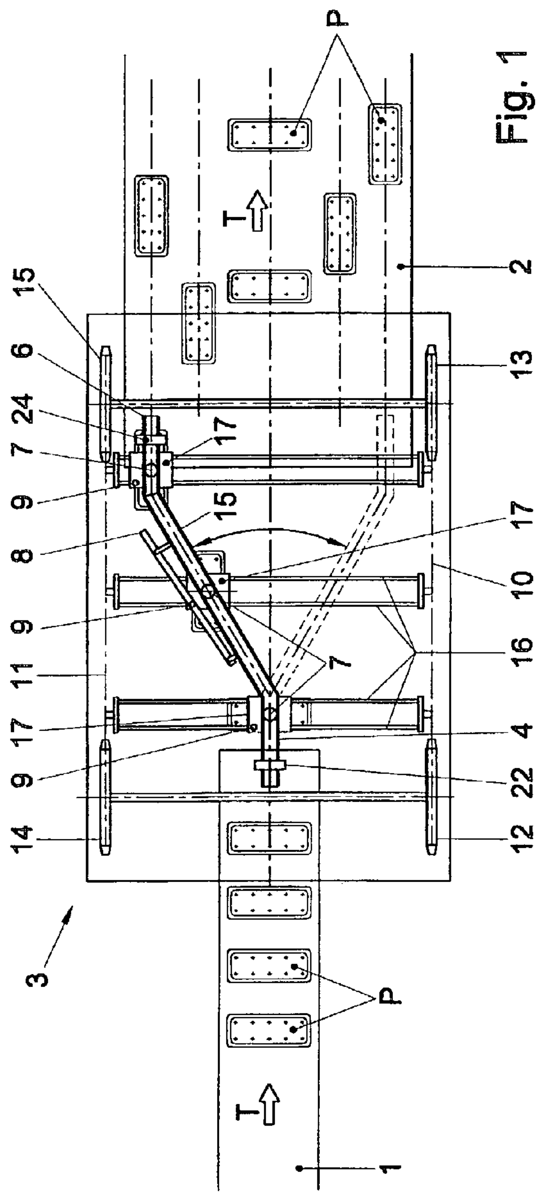
Figure 2:
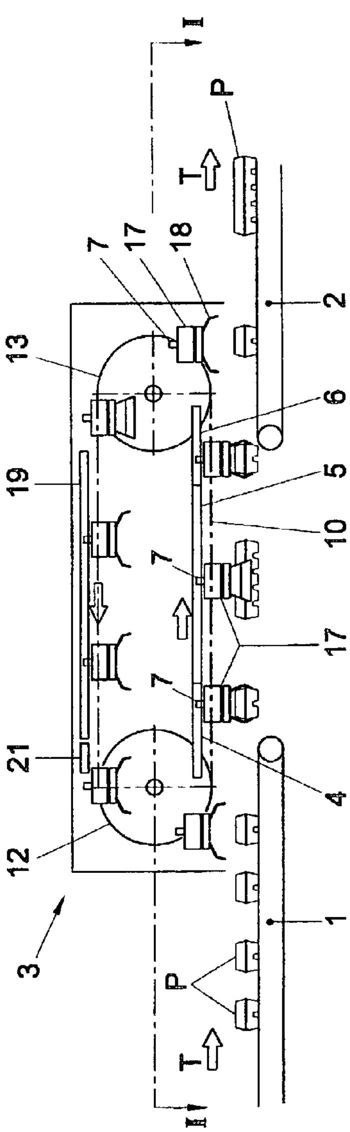
FIG. 2 shows a side elevation of the exemplary embodiment represented in FIG. 1.
Figure 3:
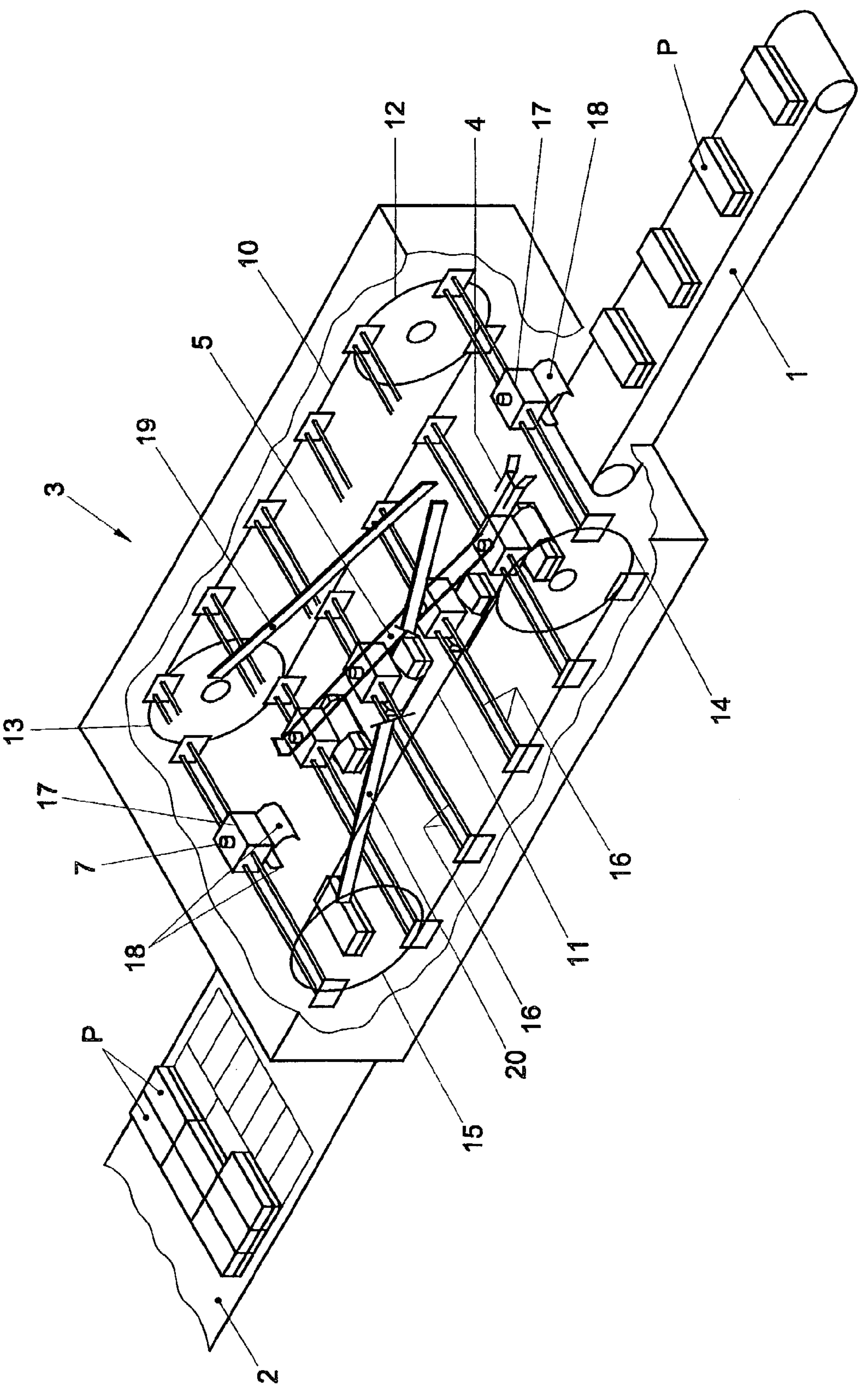
FIG. 3 shows a schematic, partly cutaway perspective view of the apparatus according to the invention.

The exemplary embodiment shown comprises a first conveyor 1 and a second conveyor 2. The first and the second conveyor 1, 2 are arranged in line with each other, have the same conveying direction T and, in use, have substantially the same conveying speed. Arranged between the first and the second conveyor is a pattern former 3 which is adapted to pick up products P supplied by the first conveyor 1 and, while maintaining the forward conveying speed, to place them on the second conveyor 2. The pattern former 3 comprises steering means 4, 5, 6, 7 to displace the product P in a direction transverse to the conveying direction, between pickup and placement of each product P.

The pattern former is further provided with orientation means 8, 9 for rotating each product P about a vertical axis, between pickup and placement of the product P, so that the orientation of the product P can be changed. The pattern former 3 of the present exemplary embodiment is provided with two endless conveying elements 10, 11 which are arranged at a distance from each other, which each pass around two rotatable bend wheels 12, 13; 14, 15 and which extend in the conveying direction T. The endless conveying elements 10, 11 can be designed, for instance, as conveyor chains, in which case the bend wheels 12–15 are designed as chain wheels. The use of conveyor belts and pulleys is also an option. The upstream bend wheels 12, 14 are located above a discharge end of the first conveyor 1. The downstream bend wheels 13, 15 are located above a feed end of the second conveyor 2. The conveying speed of the endless conveying elements 10, 11 in use corresponds substantially with the conveying speed of the first and second conveyor 1, 2. The endless conveying elements 1, 2 are connected with each other at regular distances by guide elements 16 which, in the present exemplary embodiment, are designed as pairs of guide rods 16. The guide rods 16 extend transversely to the conveying direction T. Mounted on each pair of guide rods 16 is a gripper 17 which is slidable along the respective guide element 16. The grippers 17 are each provided with two gripper blades 18 which can assume an opened position and a closed position. In the closed position the gripper blades 18 can carry a product P. The gripper 17 is represented in detail in FIG. 5.

The steering means to displace each product P in a direction transverse to the conveying direction T between pickup and placement of the product P are adapted to slide the grippers 17 along the guide elements 16. The steering means, which are clearly visible in FIG. 4, comprise a first steering track 4, 5, 6 which is provided with a run-in part 4 with a fixed run-in position, a run-out part 5 with a position displaceable in transverse direction, and a connecting part 5 which connects the run-in part 4 with the run-out part 6 and which is pivotable about a vertical axis which is located adjacent the downstream end of the run-in part 4. The steering means further comprise a steering cam 7 on each gripper 17. During the travel of a respective gripper 17, the steering cam 7 falls in the first steering track 4, 5, 6 and engages it, such that the gripper 17 follows the steering track 4, 5, 6.

The orientation means 8, 9 comprise a second steering track 8, which is represented in FIG. 1 and which extends along the first steering track 4, 5, 6, more particularly along the connecting part 5 thereof. The second steering track 8 can assume a first position in which it extends substantially parallel to the connecting part 5 of the first steering track. In a second position the second steering track 8 extends slightly obliquely relative to the connecting part 5 of the first steering track. The orientation means further comprise an orientation cam 9 on each gripper 17, which during travel of the gripper falls into the second steering track 8 and engages same, such that the gripper 17 in the first position of the second steering track 8 retains its original orientation and in the second position of the second steering track 8 rotates through a particular angle about the vertical axis referred to. In the top plan view represented in FIG. 1, the second steering track 8 is in the second position. As a result, the grippers 17 rotate through an angle of about 90°, so that the rectangular products P can be placed on the second conveyor 2 while oriented in the longitudinal direction and in the transverse direction. The first and the second steering tracks 4–6, and 8, respectively, are disposed directly above the guide elements which connect the lower parts of the endless conveying elements 10, 11 with each other. The grippers 17 therefore engage these first and second steering tracks during conveyance in the conveying direction T. In the return path of the grippers 17, these are all to be brought into the same position again in which they are ready for picking up a next product P from the first conveyor 1. To that end, above the guide elements 16 which connect the upper parts of the endless conveying elements 10, 11 with each other, two third steering tracks 19, 20 are arranged, which jointly form a funnel-shaped funneling construction and which are adapted for cooperation with the first steering cam 7 of each gripper 17 in a return path in which the grippers 17 move against the conveying direction T. At the end of the funneling construction 19, 20, a turning mechanism 21 is present which is adapted for bringing all grippers 17 into the same orientation. Such a turning mechanism 21 can be designed, for instance, as a steering track 21 which engages the orientation cam 9 of each gripper 17 when the gripper 17 passes this steering track 21. Thus, for instance, the grippers 17 that are oriented in the longitudinal direction can all be oriented in transverse direction, while the grippers already oriented in transverse direction are left as they are.

Further, the apparatus is provided with closing means 22, 23 for closing the grippers 17 adjacent the discharge end of the first conveyor 1 and with opening means 23, 24 for opening the grippers 17 adjacent the feed end of the second conveyor 2. The closing means 22, 23 comprise a gripper cam 23 (see FIG. 5) on each gripper 17 and a closing curve 22 (see FIG. 1) adjacent the run-in part of the first steering track 4. The closing curve 22 is adapted for cooperation with the gripper cam 23, such that when passing the closing curve 22 the gripper cam 23 is operated, as a result of which the gripper 17 is closed. The opening means 23, 24 comprise the same gripper cam 23 on each gripper 17 and an opening curve 24 which is arranged adjacent the run-out part 6 of the first steering track 4, 5, 6 and which is adapted for cooperation with the gripper cam 23. This cooperation is such that when passing the opening curve 24, the gripper cam 23 is operated, as a result of which the gripper 17 is opened.

Figure 4:
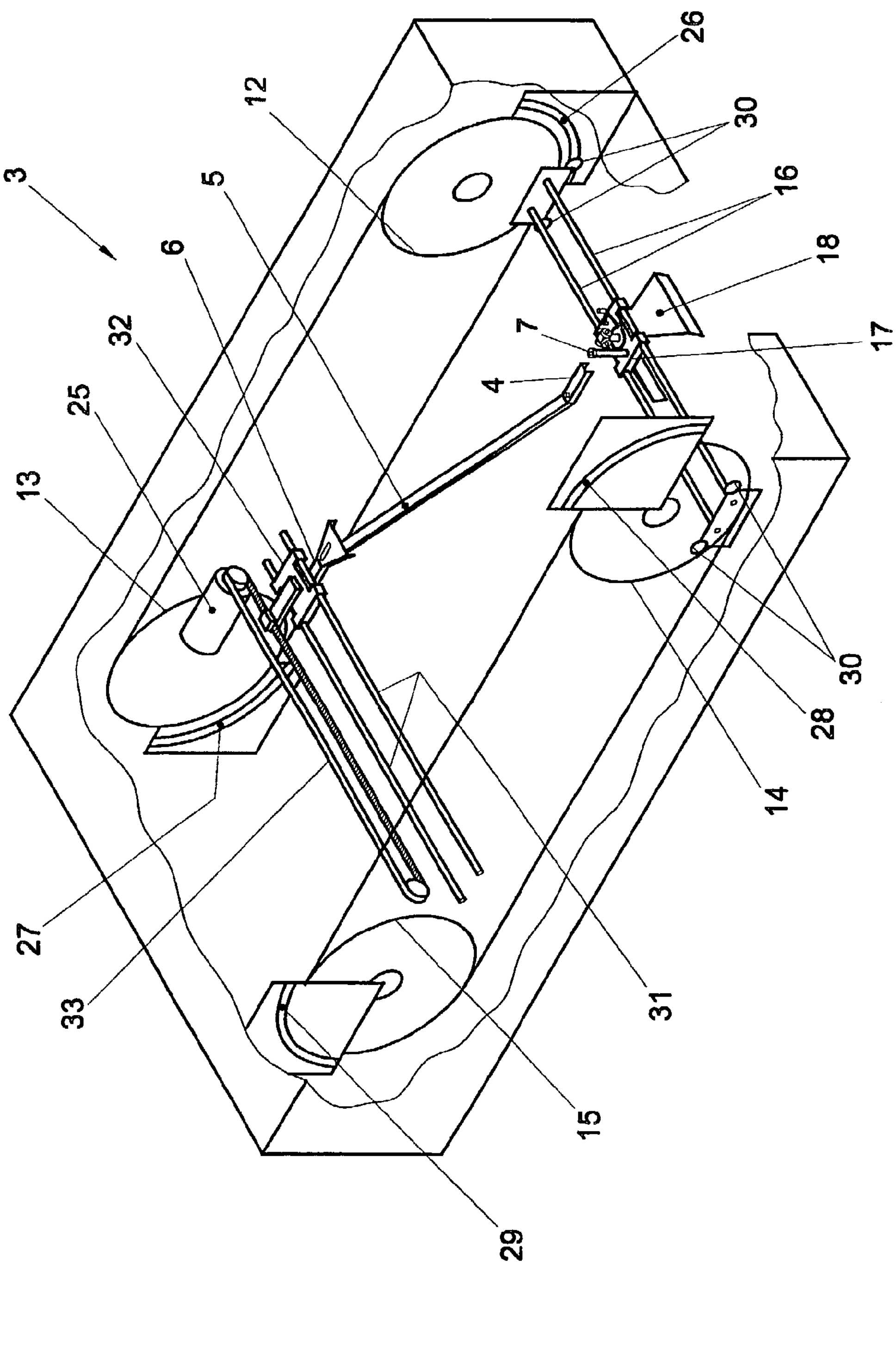
FIG. 4 shows a similar view to that represented in FIG. 3 with omission of still more parts.

The run-out part 6 is, for instance, as clearly represented in FIG. 4, mounted on a transverse guide 31 and is connected with an actuator 25 which controls the position of the run-out part 6 along the transverse guide. The connecting part 5 is pivotally connected with the run-out part 6 and thus follows the movement in transverse direction of the run-out part 6. The actuator 25 can be designed, for instance, as a servomotor, an electric motor or a pneumatic cylinder.

In the present exemplary embodiment, the transverse guide 31 is constructed as two transverse rods 31 on which a block 32 is mounted. Attached to the block 32 is a toothed belt 33 which is driven by means of the servomotor 25. In this way, any position in transverse direction can be realized.

To ensure that the grippers 17 maintain a downwardly directed position, adjacent the bend wheels 12–15, curve discs 26–29 are arranged. The guide elements 16 are rotatably connected with the endless conveying elements 10, 11. Each guide element 16 is provided, at the end thereof, with a follow cam 30 which, when passing the bend wheels 12–15, engages the curve discs 26–29. As a result, the rotational position of the guide elements 16 relative to the endless conveying elements 10, 11 will change, namely such that the grippers 17 retain the downwardly directed position. It is noted that such a provision does not need to be present and that the grippers can also turn over in the return path.

Figure 5:
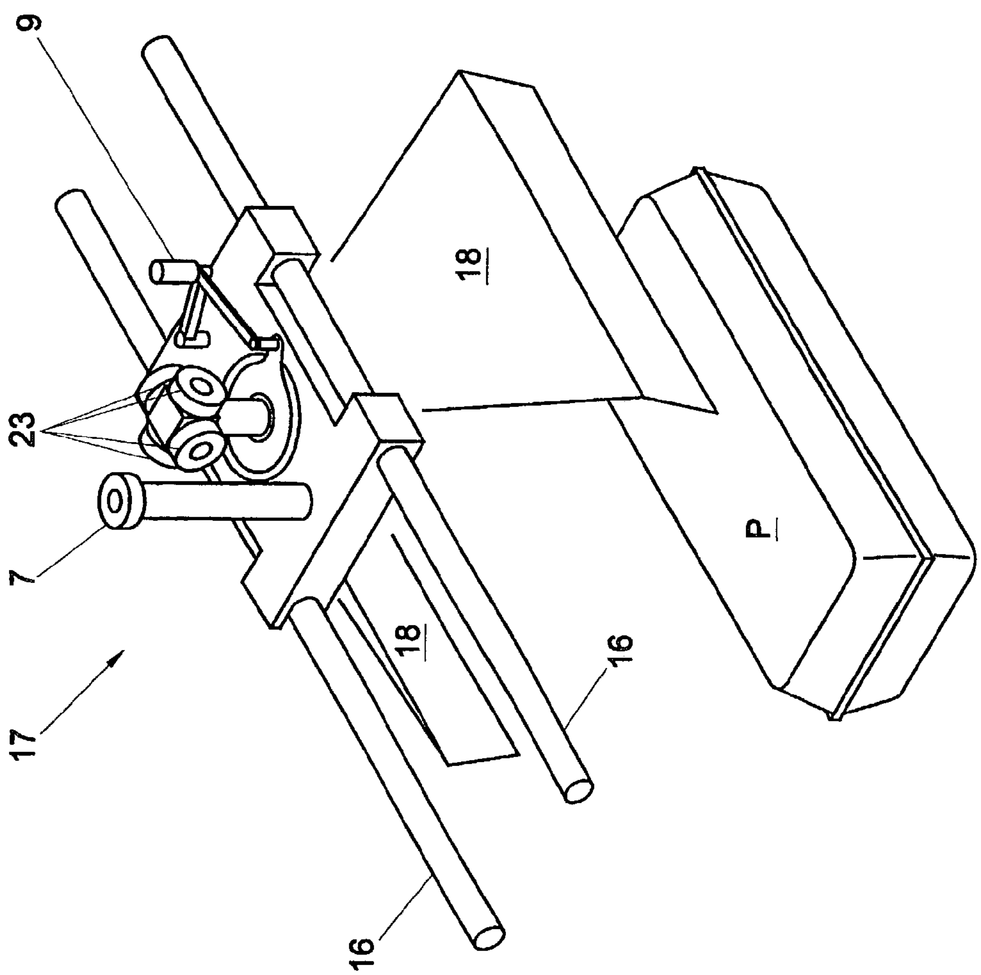
FIG. 5 shows in perspective a detail of the grippers that are used in the apparatus according to the invention.

FIG. 5 is a perspective view of the gripper 17, which clearly visualizes the steering cam 7, the orientation cam 9 and the gripper cam 23 for opening and closing the gripper blades 18.

The operation of the apparatus is as follows:

On the first conveyor 1 the products P are supplied at an appropriate pitch distance to enable them to be picked up by a gripper 17. The gripper 17 follows in a circular movement the radius of the bend wheels 12, 14 in a downward movement. At the lowest point, the gripper 17 is exactly above the product P. Thereafter the gripper 17, through the steering cam 7 thereof, enters the run-in part 4 of the steering track 4, 5, 6. Adjacent the run-in part 4, the closing curve 22 is arranged, along which the gripper cam 23 moves, so that the gripper blades 18 of the gripper 17 are closed. The gripper 17 now carries the product P. Upon further advancement, the product P is released by the first conveyor 1, and the steering cam 7 enters the connecting part 5 of the steering track 4, 5, 6. Depending on the pattern to be formed, the steering track 4, 5, 6 has been brought into a particular position. The steering cam 7 will follow the steering track 4, 5, 6, as a result of which the gripper 17 will move along the guide elements 16 in transverse direction. During travel, the orientation cam 9 of the gripper 17 enters the second steering track 8. Depending on the position of the second steering track 8, the gripper 17 will rotate a quarter turn around the vertical axis or retain the original position. At the end of the connecting part 5, the steering cam 7 enters the run-out part 6, adjacent which run-out part 6 also the opening curve 24 is arranged. The gripper cam 23 passes the opening curve 24, so that the gripper blades 18 are opened and the product P is released from the gripper 17. Meanwhile, the gripper 17 is above the second conveyor 2 and the product P is therefore placed on the second conveyor 2. Due to the second conveyor 2 having substantially the same forward speed as the gripper 17, the gripper blades 18 of the gripper 17, during the rising movement of the gripper 17 along the circular path defined by the bend wheels 13 and 15, will not collide with the product P. In the return path, the different grippers 17, since they are located at different positions in transverse direction on the guide elements 16, will have to be moved to a central point on the guide elements 16 again to bring the grippers in line with the first conveyor 1 again. Therefore, in the return path, the steering cam 7 engages either of the two third steering tracks 19, 20 which together form the funnel-shaped funneling construction. In the turning mechanism 21 which is mounted at the end of the funneling construction, the grippers 17 which had rotated a quarter turn are brought back into their original position again by the second steering track 8. The grippers 17 are now all in the same position on the guide elements 16 and in the same orientation. They subsequently continue the downward circular movement along the radius of the chain wheels 12, 14 whereafter the above-described cycle will repeat itself. On a downstream part of the second conveyor 2 a stop 34 may be arranged which stops the products supplied in succession, so that against this stop the desired pattern will be formed. When a complete pattern has been formed, the set of products can be taken up to be placed in an outer package. Owing to the feature that in the pattern former 3 all movements are performed continuously, the apparatus can form products P into a pattern at a high speed, even when these products P are fragile, which is the case with cartons of eggs.

It will be clear that the invention is not limited to the exemplary embodiment described, but that various modifications are possible within the scope of the invention. Optionally, between the first and the second conveyor 1, 2, respectively, a supporting plate may be arranged which lightly supports the products P when they are in a gripper. What can thus be prevented is that a product P, if it should be improperly received in a gripper 17, might fall to the ground between the two conveyors 1, 2.

What is claimed is:

1. An apparatus comprising:

a first conveyor;

a second conveyor, the first conveyor and the second conveyor being arranged in line with each other and having the same conveying direction, and substantially the same conveying speed; and a manipulator for picking up products supplied by the first conveyor and for placing the products on the second conveyor, the manipulator being a pattern former comprising:

two endless conveying elements which are arranged in mutually spaced relation and which extend in the conveying direction, the endless conveying elements passing around upstream bend wheels being located above a discharge end of the first conveyor, and the endless conveying elements passing around downstream bend wheels being located above a feed end of the second conveyor, the conveying speed of the endless conveying elements in use substantially corresponds with the conveying speed of the first conveyor and the second conveyor;

guide elements which extend transversely to the conveying direction and which connect the endless conveying elements at regular distances;

each guide element having mounted thereon a gripper which is slidable along the respective guide element, the grippers are arranged for gripping products to be handled; and steering means for displacing a gripper in a direction transverse to the conveying direction along the respective guide element to a desired position between picking up and placement of each product, and said steering means adapted to slide the grippers along the guide elements, said steering means comprising:

a first steering track which is provided with a run-in part having a fixed run-in position, a run-out part having a position displaceable in transverse direction, and a connecting part which connects the run-in part with the run-out part and which is pivotable about a vertical axis which is located adjacent the downstream end of the run-in part, and a steering cam on each gripper, each steering cam, during travel of a respective gripper, falling into the first steering track and engaging the same track, such that the gripper follows the steering track.

2. The apparatus according to claim 1, wherein the pattern former further comprises orientation means for rotating each product about a vertical axis between pickup and for placement of the product, so that the orientation of the product can be changed.

3. The apparatus according to claim 2, wherein the orientation means comprise a second steering track which extends along at least a part of the first steering track and which in a first position runs parallel thereto and in a second position runs slightly obliquely with respect to the first steering track, the orientation means further comprising an orientation cam on each gripper which upon travel of the gripper falls into the second steering track and engages same, such that the gripper in the first position of the second steering track maintains its original orientation and in the second position of the second steering track rotates through a particular angle about said vertical axis.

4. The apparatus according to claim 1, further comprising two third steering tracks, which jointly form a funnel-shaped funneling construction and which are arranged for cooperation with the first steering cam of each gripper in a return path in which the grippers move against the conveying direction, while at the end of the funneling construction a turning mechanism is present which is adapted for bringing all grippers into the same orientation.

5. The apparatus according to claim 1, further comprising closing means for closing the grippers adjacent the discharge end of the first conveyor and with opening means for opening the grippers adjacent the feed end of the second conveyor.

6. The apparatus according to claim 1, wherein the closing means comprise a gripper cam on each gripper and a closing curve, which closing curve is arranged adjacent the run-in part of the first steering track and is adapted for cooperation with said gripper cam, such that when passing the closing curve the gripper cam is operated, as a result of which the gripper is closed.

7. The apparatus according to claim 1, wherein the opening means comprise a gripper cam on each gripper and an opening curve, which opening curve is arranged adjacent the run-out part of the first steering track and is adapted for cooperation with said gripper cam, such that when passing the opening curve the gripper cam is operated, as a result of which the gripper is opened.

8. The apparatus according to claim 1, wherein the position of the run-out part and the connecting part of the first steering track is controlled with a servomotor.

9. The apparatus according to claim 1, wherein the position of the run-out part and the connecting part of the first steering track is controlled with a pneumatic cylinder.

10. The apparatus according to claim 1, wherein the position of the run-out part and the connecting part of the first steering track is controlled with an electric motor.

11. The apparatus according to claim 1, further comprising curved discs arranged adjacent bend wheels, the guide elements are rotatably connected with the endless conveying elements and the guide elements which pass the bend wheels engage said curve discs with a follow cam, in order that the guide elements rotate relative to the endless conveying elements, such that the grippers maintain a downwardly directed position.

12. An apparatus comprising:

a first conveyor;

a second conveyor, the first conveyor and the second conveyor being arranged in line with each other and having the same conveying direction, and substantially the same conveying speed; and a manipulator for picking up products supplied by the first conveyor and for placing the products on the second conveyor, the manipulator being a pattern former comprising:

two endless conveying elements which are arranged in mutually spaced relation and which extend in the conveying direction, the endless conveying elements passing around upstream bend wheels being located above a discharge end of the first conveyor, and the endless conveying elements passing around downstream bend wheels being located above a feed end of the second conveyor, the conveying speed of the endless conveying elements in use substantially corresponds with the conveying speed of the first conveyor and the second conveyor;

guide elements which extend transversely to the conveying direction and which connect the endless conveying elements at regular distances;

each guide element having mounted thereon a gripper which is slidable along the respective guide element, the grippers are arranged for gripping products to be handled;

orientation means for rotating each product about a vertical axis between pickup and for placement of the product, so that the orientation of the product can be changed, said orientation means comprising:

a second steering track which extends along at least a part of the first steering track and which in a first position runs parallel thereto and in a second position runs slightly obliquely with respect to the first steering track, and an orientation cam on each gripper which upon travel of the gripper falls into the second steering track and engages same, such that the gripper in the first position of the second steering track maintains its original orientation and in the second position of the second steering track rotates through a particular angle about said vertical axis; and steering means for displacing a gripper in a direction transverse to the conveying direction along the respective guide element to a desired position between picking up and placement of each product, and said steering means adapted to slide the grippers along the guide elements, said steering means comprising:

a first steering track which is provided with a run-in part having a fixed run-in position, a run-out part having a position displaceable in transverse direction, and a connecting part which connects the run-in part with the run-out part and which is pivotable about a vertical axis which is located adjacent the downstream end of the run-in part, and a steering cam on each gripper, each steering cam, during travel of a respective gripper, falling into the first steering track and engaging the same track, such that the gripper follows the steering track.

13. The apparatus according to claim 12, further comprising two third steering tracks, which jointly form a funnel-shaped funneling construction and which are arranged for cooperation with the first steering cam of each gripper in a return path in which the grippers move against the conveying direction, while at the end of the funneling construction a turning mechanism is present which is adapted for bringing all grippers into the same orientation.

14. The apparatus according to claim 12, further comprising closing means for closing the grippers adjacent the discharge end of the first conveyor and with opening means for opening the grippers adjacent the feed end of the second conveyor.

* * * * *